United States Patent [19]

Akeel

[11] Patent Number: 4,653,975
[45] Date of Patent: Mar. 31, 1987

[54] ROBOT WITH COUNTERBALANCE MECHANISM HAVING MULTIPLE ATTACHMENT LOCATIONS

[75] Inventor: Hadi A. Akeel, Sterling Heights, Mich.

[73] Assignee: GMF Robotics Corporation, Troy, Mich.

[21] Appl. No.: 693,588

[22] Filed: Jan. 22, 1985

[51] Int. Cl.$^4$ .............................................. B66C 23/72
[52] U.S. Cl. ........................................ 414/720; 74/592; 248/289.3; 248/292.1; 901/48
[58] Field of Search ............... 414/729, 730, 719, 720; 901/48; 74/592, 591, 590, 603; 248/292.1, 289.3, 364; 16/280, 281, 1 C, 289, 306, 194

[56] References Cited

U.S. PATENT DOCUMENTS

| 2,550,338 | 4/1951 | Dunagan | 248/289.3 |
| 3,204,287 | 9/1965 | Gronbach | 74/592 X |
| 4,500,251 | 2/1985 | Kiryu et al. | 901/48 |

FOREIGN PATENT DOCUMENTS

| 200370 | 4/1983 | Fed. Rep. of Germany | 901/48 |
| 715317 | 2/1980 | U.S.S.R. | 901/48 |
| 861061 | 9/1981 | U.S.S.R. | 901/48 |

Primary Examiner—Robert J. Spar
Assistant Examiner—Donald W. Underwood
Attorney, Agent, or Firm—Brooks & Kushman

[57] ABSTRACT

A robot, including an arm assembly and an energy-storing balancing mechanism which is connected to the arm assembly at a pair of attachment points so that the arm assembly is substantially balanced within a quadrant of arm assembly motion on both sides of a neutral position of the arm assembly relative to the rest of the robot. The balancing mechanism includes a spring assembly having a longitudinal axis which extends towards and is substantially perpendicular to a pivotal axis about which the arm assembly pivots from its neutral position. The spring assembly is preferably connected by a pair of internally slotted links for slidably and pivotally connecting the spring assembly at the attachment points. Each attachment point is only effective (i.e. experiences the pulling force of the spring assembly) during a single quadrant of arm assembly motion.

6 Claims, 7 Drawing Figures

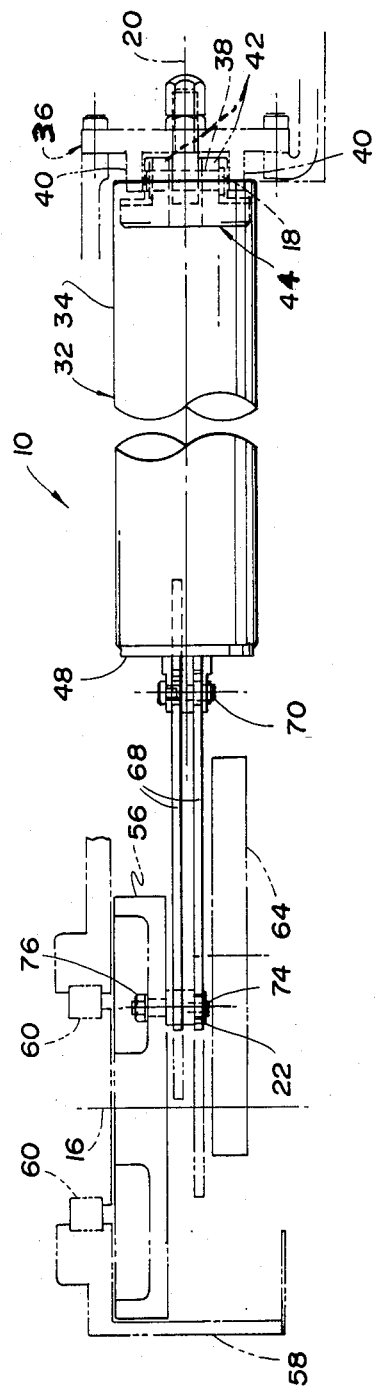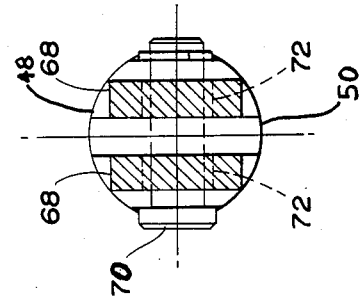

ROBOT WITH COUNTERBALANCE MECHANISM HAVING MULTIPLE ATTACHMENT LOCATIONS

TECHNICAL FIELD

This invention relates to robots having counterbalance mechanisms and, in particular, to robots having articulated and/or hinged arms which must be balanced to compensate for the effects of gravity.

BACKGROUND ART

Balancing for gravitational effects is usually required for hinged and/or articulated arm robots when such robots are likely to be activated manually or by some lower level power source. Such an occurrence typically takes place during teaching. Elimination or reduction of the effects of gravity allow the use of smaller power sources which reduces energy utilization and allows for better stability of servo-controlled mechanisms, such as the robot arm. With a balancer mechanism articulated arm robots can be designed so that they can be manually led through their desired tasks without the use of a prime mover and the complexity associated with the controller of the robot. As a result the robot arm can be manually led through each desired task under low level power requirements.

The prior art shows numerous gravity balancing mechanisms used on articulated arms and hinge mechanisms. One such arrangement utilizes counterweights for balancing the robot arm. However, the use of counterweights is oftentimes objectionable because of the added mass and resulting increase in arm inertia. For example, the inertia of a counterweight must be overcome every time the robot arm is to be moved in a different direction. Braking and change of direction of the robot arm is subject to inertial deceleration and acceleration forces due to the counterweights.

The following prior art patents disclose the use of counterweights as counterbalance mechanisms: the U.S. patent to Roselund No. 2,344,108; the U.S. patent to Cooper No. 3,543,989; and the U.S. patent to Le Rouzo No. 4,402,646.

Other prior art patents disclose the use of hydraulic and pneumatic balancers of both the active and passive type. Active balancers require an external power source to supply or absorb the balancing energy. Passive balancers store and release the balancing energy as required. Many of such hydraulic or pneumatic counterbalance mechanism are relatively complex and costly. For example, the U.S. patent to Panissidi, U.S. Pat. No. 4,229,136 discloses an air pressure counterbalance system including an air-driven piston operated in the direction of the gravity axis as the manipulator hand is raised and lowered. The weights of different tools are programmed into computer memory and thereafter an air pressure regulator adjusts the counterbalancing force depending upon which tools are used by the manipulator.

Other U.S. patents which disclose hydraulic or pneumatic counterbalancing mechanisms include the U.S. patents to Sack et al. No. 3,370,452 and Davini No. 4,300,198.

When balancing is required within a small angle or within a single quadrant (i.e. from a horizontal to vertically upward orientation) a level of balancing can be obtained with a spring or a passive pneumatic balancer. The following prior art patents disclose spring balancers which are useful within small angles of movement: the U.S. patent to Flatau No. 3,391,804; the U.S. patent to Stolpe No. 4,024,961; the U.S. patent to Belyanin et al No. 4,259,876; the U.S. patent to Vertut No. 4,283,165; and the U.S. patent to Susnjara No. 4,378,959.

One objection to the use of conventional spring balancers is that the spring normally can only apply a variable force and there is normally no continuous and/or adequate compensation for the effect of varying gravitational forces. Also, it is inherent in most spring balancing methods that complete balance is possible only for one or two configurations of the arm and spring combination. As the robot arm moves away from that configuration in either of two possible directions, an unbalance is generated and progressively changes until the arm approaches a neutral orientation of zero gravitational moment.

Spring balancers currently do not provide adequate balancing over extended angular movement of the robot arm. Because of this, oftentimes there are high actuation power requirements to overcome the effects of gravity on the robot arm, especially if the robot arm is moved upwards. Such high actuation power requirements present a safety hazard if the mechanism should fall under the force of gravity when motor power is shut off. Consequently, such mechanisms are usually provided with brakes to alleviate that potential danger.

Spring stiffness, initial tensioning and anchor point location can be adjusted to give a higher degree of balance within a small angular displacement of the arm and also limit the maximum value of the unbalanced moment and/or its direction. Beyond that displacement the degree of unbalance grows relatively rapidly.

Despite the relative simplicity and relative inexpensiveness of conventional spring and passive pneumatic balancers, the balancers have generally not been able to overcome their current angular limitations.

DISCLOSURE OF THE INVENTION

An object of the present invention is to extend the capability of passive balancers so as to provide minimum unbalance beyond one quadrant of robot arm rotation and to be equally effective during two quadrants of robot arm rotation.

Another object of the present invention is to provide an improved balancer whose capabilities have been extended by allowing the balancer to have a pair of attachment points to the robot arm only one of which is effective during one quadrant of motion on one side of a neutral position.

Still another object of the present invention is to provide a passive balancer adapted for attachment to a robot arm at a pair of attachment points and including improved means for attaching the balancer mechanism at the attachment points which are alternately effective as the robot arm moves from one quadrant to another.

In carrying out the above objects and other objects of the present invention, a robot constructed in accordance with the present invention includes an arm assembly having a pivotal connection that pivotally supports the arm assembly on the rest of the robot for movement about a pivotal axis. An energy-storing balancing mechanism is mounted on the rest of the robot. The mechanism has a longitudinal axis which extends towards and substantially perpendicular to the pivotal axis in a neutral position of the arm assembly. The balancing mechanism is connected to the arm assembly on opposite sides of the longitudinal axis at attachment points in the neutral position to substantially balance the arm assembly within a quadrant of arm assembly motion on each side of the neutral position.

Preferably, the balancing mechanism includes a spring assembly which extends along the longitudinal axis in the neutral position.

Also, preferably, a pair of links are included for connecting the balancing mechanism to the arm assembly at the attachment points. Each link is internally slotted at its opposite ends for slidable and pivotal connection at the attachment points and to the spring assembly. Each attachment point is effective (i.e. experiences the pulling force of the spring assembly) only during a single quadrant of arm assembly motion and is ineffective during the other quadrant of arm assembly motion.

Further in carrying out the above objects and other objects of the present invention, the balance mechanism constructed in accordance with the present invention is adapted to be mounted to a robot and, when so mounted, has a longitudinal axis which extends towards and substantially perpendicular to a pivotal axis of a pivotally mounted arm assembly of the robot in a neutral position of the arm assembly. The balancing mechanism is adapted to be connected to the arm assembly of the robot on opposite sides of the longitudinal axis at attachment points in the neutral position of the arm assembly to substantially balance the arm assembly within a quadrant of arm assembly motion on each side of the neutral position.

Other advantages of the present invention will be readily appreciated as the same become better understood by reference to the following detailed description when considered in connection with the accompanying drawings.

BRIEF DESCRIPTION OF THE DRAWINGS

FIG. 5 is a top plan view, partially broken away, corresponding to the view of FIG. 4;

FIG. 6 is a sectional view illustrating the interconnection between a spring assembly of the balancer mechanism and the mechanism for connecting the spring assembly to the arm assembly.

BEST MODE FOR CARRYING OUT THE INVENTION

Figure 1:
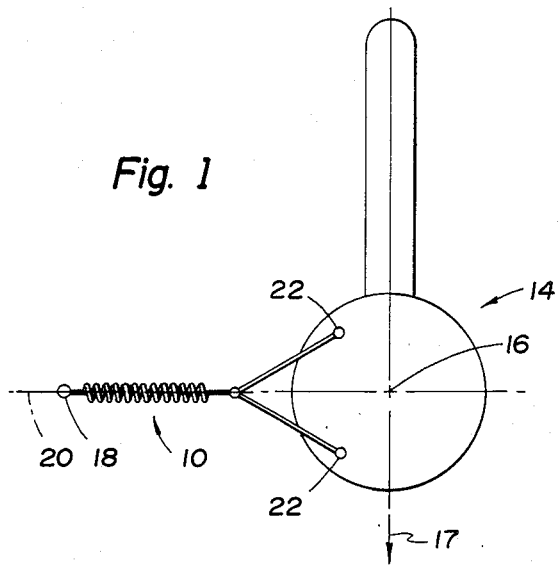
FIG. 1 is a schematic drawing of a robot and balancer mechanism of the present invention connected to an arm assembly of the robot and illustrating a neutral position of the arm assembly.
Figure 2:
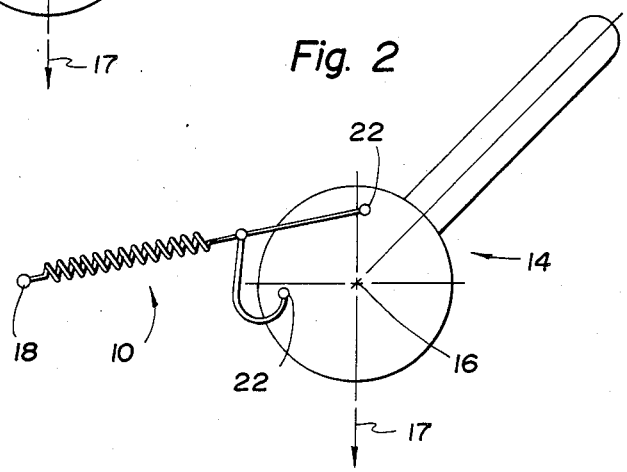
FIG. 2 is similar to FIG. 1 except the arm assembly is shown in a first angularly displaced position from the neutral position of FIG. 1.
Figure 3:
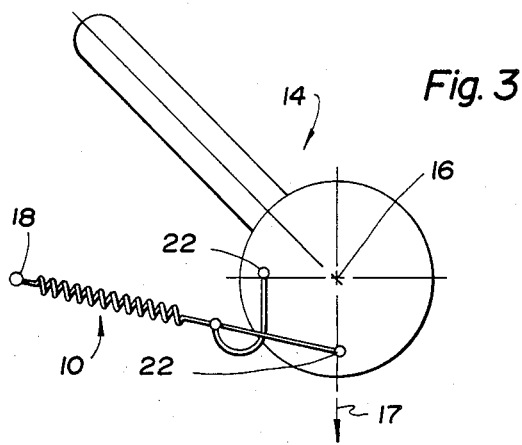
FIG. 3 is similar to the view of FIGS. 1 and 2 except the arm assembly is shown in a second angularly displaced position from the neutral position of FIG. 1 opposite that of FIG. 2.

Referring now to the drawings, there is illustrated at FIGS. 1 through 3 a schematic form of the present invention. An energy-storing balancing mechanism, generally indicated at 10, substantially balances an arm assembly of a robot, generally indicated at 14. The arm assembly 14 has a pivotal connection which pivotally supports it on the rest of the robot for movement about a pivotal axis 16.

The balancing mechanism 10 is mounted or anchored to the rest of the robot at an attachment location 18. The balancing mechanism 10 has a longitudinal axis 20 which extends towards and is substantially perpendicular to the pivotal axis 16 in a neutral position of the arm assembly 14 in relation to a prevailing gravitational vector 17 as shown in FIG. 1. The neutral position is above the pivotal axis 16. The neutral position represents a maximum potential energy condition of the arm assembly 14 (i.e. the arm assembly 14 tends to fall away from the neutral position).

Figure 7:
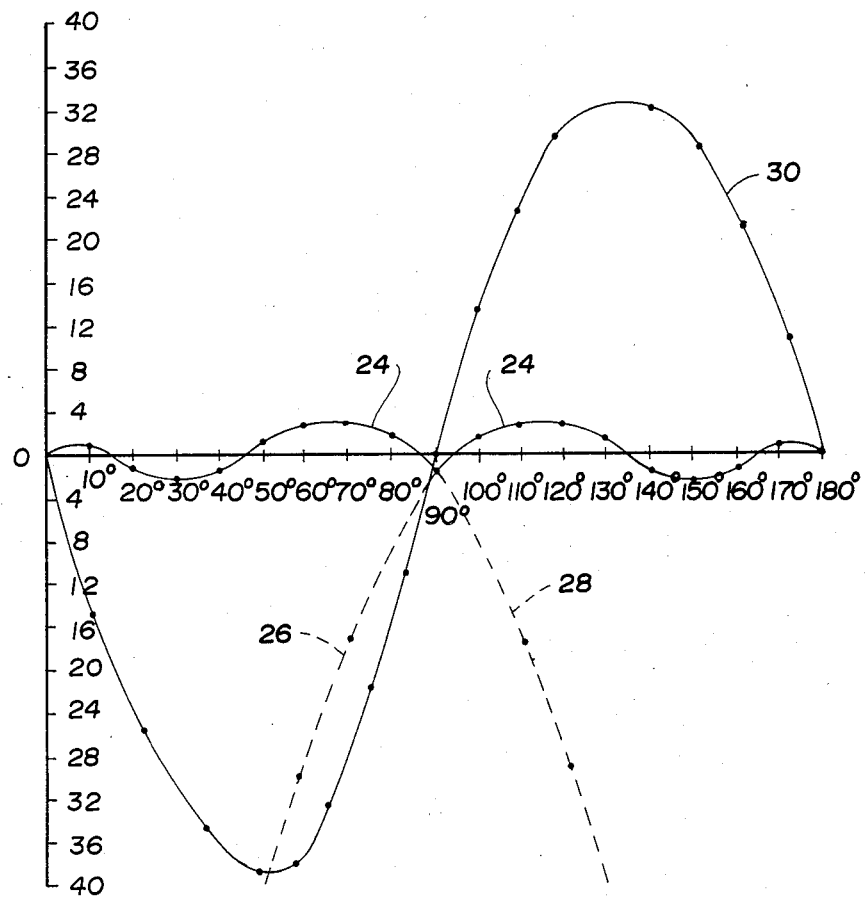
FIG. 7 is a graph illustrating the performance characteristics of the balancer mechanism compared with balancer mechanisms of conventional construction.

The balancing mechanism 10 is connected to the arm assembly 14 on opposite sides of the longitudinal axis 20 at attachment points 22 in the neutral position of the arm assembly 14. As illustrated in FIGS. 2 and 3, each attachment point 22 is effective only during a single quadrant of arm assembly motion (i.e. 90°) and ineffective during the other quadrant of arm assembly motion as graphically illustrated in FIG. 7 by lines 24, 26 and 28. The vertical axis of the graph of FIG. 7 represents percent unbalance of the maximum gravitational moment of a particular construction of the balancing mechanism 10. The horizontal axis represents the number of degrees, in 10° increments, that the arm assembly 14 is angularly displaced from one outer limit of arm assembly motion (i.e. 0°). The angle 180° represents the second outer limit of arm assembly motion. The various angular displacements between zero and 180° therefore represent different arm assembly positions in the two quadrants of arm assembly motion, with 90° representing the neutral position of the arm assembly 14, as shown in FIG. 1.

Dashed line 26 illustrates a relatively large percent of imbalance if one of the attachment locations 22 was not provided during arm motion in one direction from the neutral position. Likewise, dashed line 28 illustrates the relatively large unbalance associated with arm assembly motion in the other direction from the neutral position with the other attachment location 22 eliminated. The line 30 illustrates a conventional spring balance performance during two quadrants or 180° of assembly arm motion.

Figure 4:
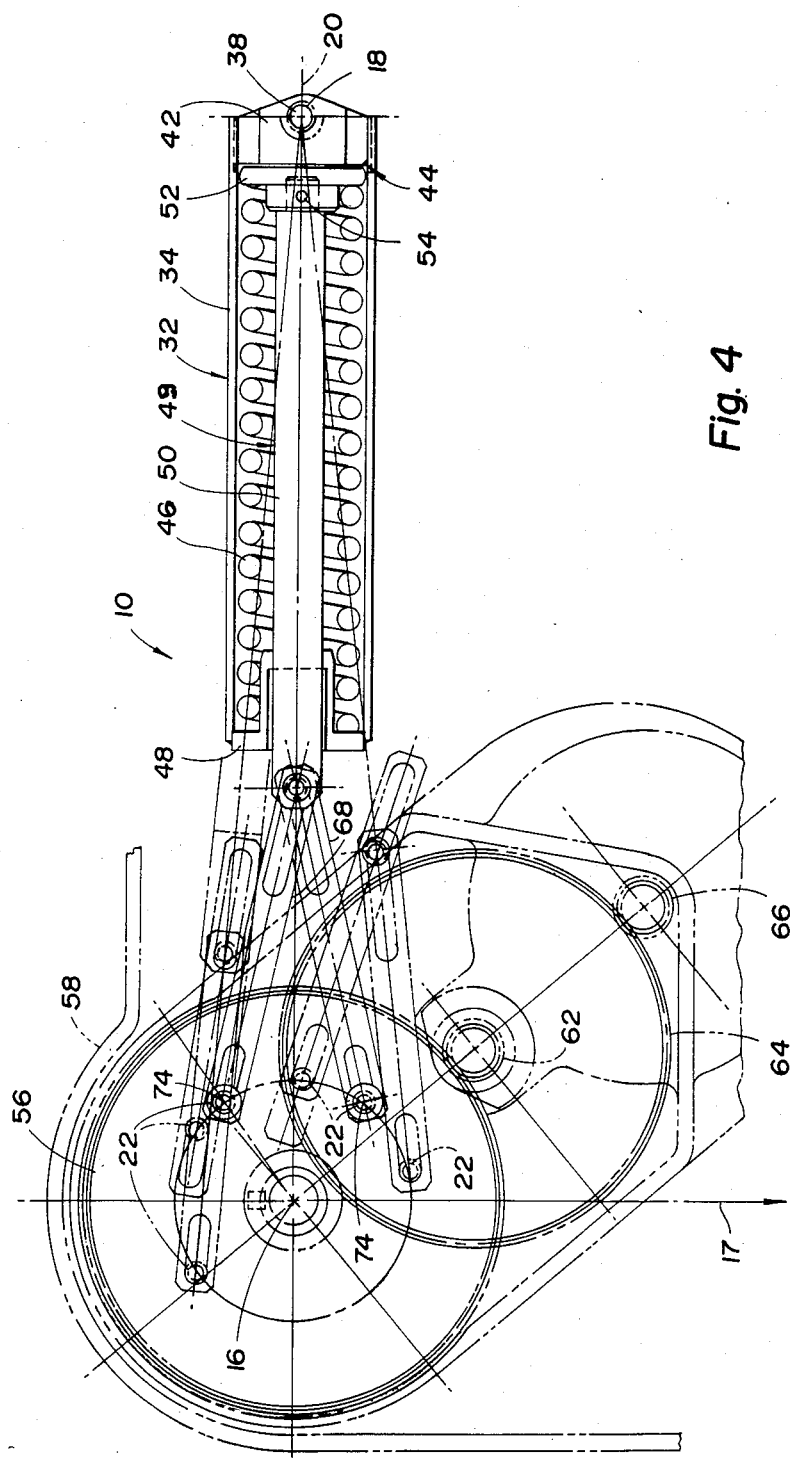
FIG. 4 is a side view, partially broken away, illustrating various operative positions of a balancer mechanism of a preferred construction of the present invention.

Referring now to FIGS. 4 through 6, there is illustrated a preferred balancing mechanism 10 constructed in accordance with the present invention. The balancing mechanism 10 comprises a spring assembly, generally indicated at 32. The spring assembly 32 includes a spring housing 34 which is pivotally mounted to a support structure of the robot, as generally indicated in phantom at 36 in FIG. 5, by a fixture pin 38. The fixture pin 38 extends between a pair of mounting flanges 40 of the support structure 36 and also between a pair of mounting flanges 42 of a cap, generally indicated at 44. The cap 44 forms one end of the housing 34 and is mounted within the one end of the housing 34.

The spring assembly 32 includes a spiral spring 46 disposed within the housing 34 and held between a plunger part 52 of a plunger, generally indicated at 49, and a top end cap 48 which is fitted into the opposite end of the housing 34. The plunger 49, extends through the spring housing 32 and along the longitudinal axis 20. The plunger 49 also includes a plunger shaft 50 as well as the plunger part 52 which is fixedly connected at one end of the shaft 50 by a grooved pin 54. The other end of the shaft 50 extends through the end cap 48. Movement of the shaft 50 to the left as shown in FIG. 4 tends to compress the spiral spring 40 thereby storing energy in the spring 40.

The balancing mechanism 10 is connected to a drive gear 56 of the inner arm assembly 14 at the attachment locations 22. The drive gear 56 is rotatably mounted within a drive housing 58 by bearings 60 as best shown in FIG. 5.

As best shown in FIG. 4, the drive gear 56 is driven by a pinion gear 62 which, in turn, is driven by a gear 64 which is mounted on the same drive shaft as the pinion gear 62. In the same fashion, the gear 64 is driven by a pinion gear 66 mounted on the drive shaft of a servo motor (not shown) which thereby causes the entire arm assembly 14 to rotate.

The balancing mechanism 10 is connected to the gear 56 at the attachment location 22 by a pair of links 68. Each link 68 is internally slotted at its opposite ends for slidable and pivotal connection at the attachment points 22 and at the free end of the plunger shaft 50. The plunger shaft 50 is pivotally connected to the links 68 by a pin 70, as best shown in FIGS. 5 and 6. Sleeve bushings 72 are provided about the pin 70 to pivotally and slidably support the links 68. In the same fashion, sleeve bushings (not shown) are provided about pins 74 at the attachment locations 22. Each pin 74 is secured to the gear 56 by a nut 76, only one of which is shown in FIG. 5.

With reference to FIG. 4, it can be seen that the slots in the slotted links 68 allow the links 68 to alternately connect the balancing mechanism 10 at different points on the gear 56 upon angular displacement of the arm assembly 14 from its neutral position. In this way, rapid movement of a line of force through the spring assembly 32 to the respective attachment point is provided. The slots are sized so that the links can act as a tension element within one quadrant of motion and are free to slide in relation to the attachment points within the other quadrant of motion.

Alternately, instead of sliding links 68, the attachment mechanism for attaching the balancing mechanism 10 to the arm assembly 14 may comprise ropes, chains or other attachment devices which are operative in a tensile mode and are inoperative in a compressive mode.

As can be readily appreciated by one of ordinary skill in the art, other passive balancers such as a passive pneumatic balancer may be utilized instead of the spring assembly 32 without departing from the spirit of the present invention.

The above-described energy-storing balancing mechanism 10 provides minimum unbalance during one quadrant of arm assembly rotation and is equally effective in two quadrants of arm assembly rotation. As illustrated in the preferred construction, a passive energy-storing device, such as a spring, is utilized. The resulting construction is not only relatively inexpensive, but also relatively simple and may be utilized in a wide variety of applications.

The invention has been described in an illustrative manner, and it is to be understood that the terminology which has been used is intended to be in the nature of words of description, rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A robot comprising:
    an arm assembly having a pivotal connection that pivotally supports the arm assembly on the rest of the robot for movement about a substantially horizontal pivotal axis;
    an energy-storing balancing mechanism mounted on the rest of the robot, said mechanism having a longitudinal axis extending towards and substantially perpendicular to said pivotal axis in a neutral position of said arm assembly and
    means for connecting said balancing mechanism to said arm assembly on opposite sides of said longitudinal axis at two attachment points outwardly of said pivotal connection, said means for connecting including two connector elements, each of said elements operatively connecting the mechanism to the arm assembly in a tensile mode when said arm assembly is in said neutral position and each element being alternately moved to a nontension position when said arm assembly is rotated about said pivotal connection in either direction, said mechanism substantially balancing the arm assembly within a quadrant of arm assembly motion on each side of said neutral position by a rapid movement of a line of force through said spring assembly to the respective attachment point to compensate for the variable efforts of gravity on said arm assembly during pivotal motion about said pivotal axis.

2. The invention as claimed in claim 1 wherein said balancing mechanism includes a spring assembly extending along said longitudinal axis in said neutral position for providing a pulling force to the arm assembly at said attachment points.

3. The invention as claimed in claim 1 wherein said means for connecting comprises a pair of links for connecting the balancing mechanism to the arm assembly at the attachment points.

4. The invention as claimed in claim 3 wherein each link is internally slotted at its opposite ends for slidable and pivotal connection at the attachment points and to said balancing mechanism.

5. The invention as claimed in claim 2 wherein said spring assembly includes a single spiral spring mounted within a spring housing and a plunger extending through said spring housing and the coils of said spring for compressing said spring during arm assembly motion in either direction about the pivotal axis from said neutral position.

6. The invention as claimed in claim 3 wherein said arm assembly includes a drive gear pivotally mounted for rotation about the pivotal axis and wherein said drive gear includes said attachment points.

* * * * *